Aug. 25, 1925.
D. F. FESLER
1,550,896
LUBRICANT COMPRESSOR
Filed May 29, 1920
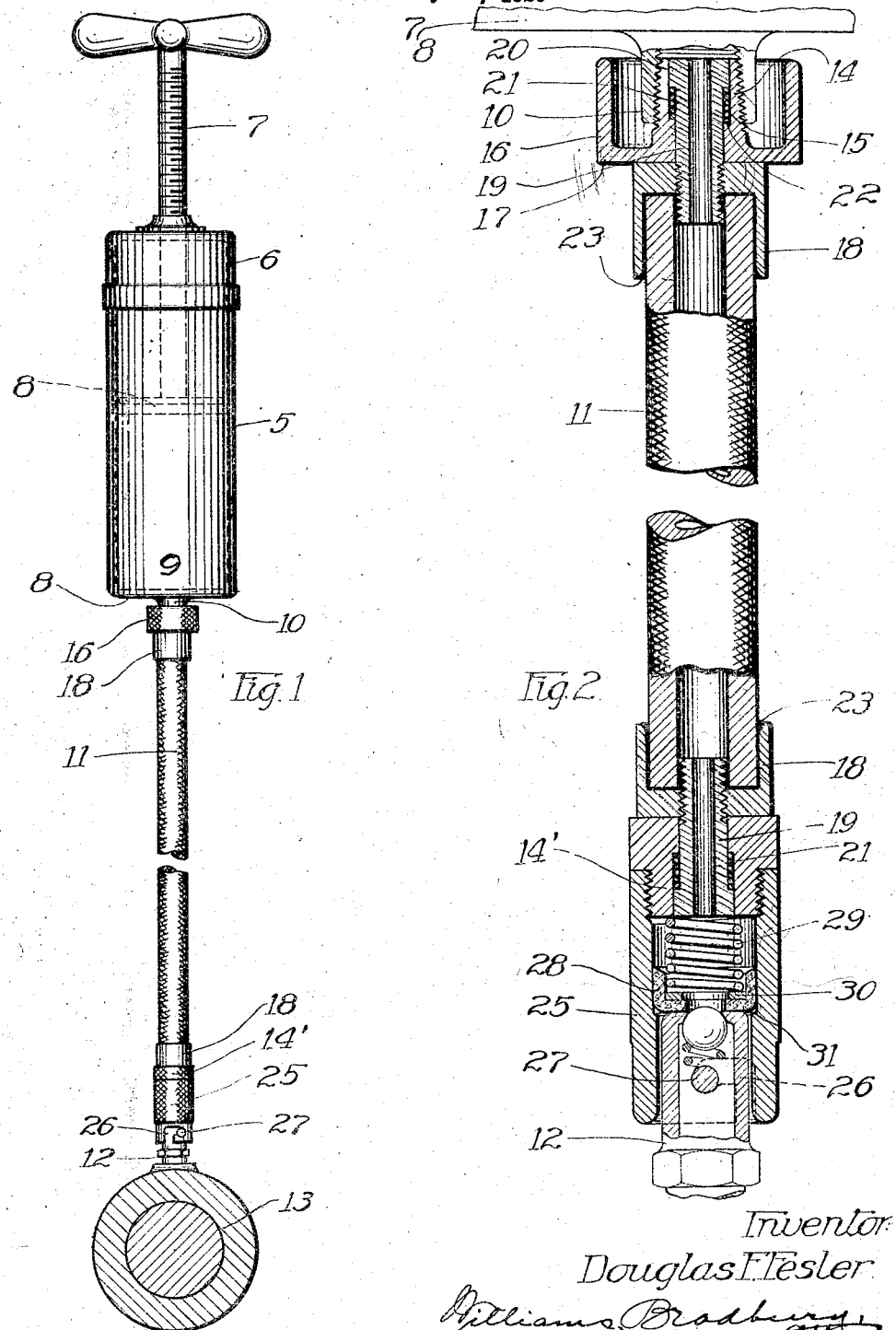
Inventor
Douglas F. Fesler Patented Aug. 25, 1925.

1,550,896

UNITED STATES PATENT OFFICE.

DOUGLAS F. FESLER, OF EVANSTON, ILLINOIS, ASSIGNOR TO THE BASSICK MANUFACTURING COMPANY, OF CHICAGO, ILLINOIS, A CORPORATION OF DELAWARE.

LUBRICANT COMPRESSOR.

Application filed May 29, 1920. Serial No. 385,209.

*To all whom it may concern:*

Be it known that I, DOUGLAS F. FESLER, a citizen of the United States, residing at Evanston, in the county of Cook and State of Illinois, have invented a certain new and useful Improvement in Lubricant Compressors, of which the following is a full, clear, concise, and exact description, reference being had to the accompanying drawings forming a part of this specification.

My invention relates to improvements in lubricant compressors, and is especially concerned with improvements in compressors of this type adapted to be used as a part of the lubricating system described and claimed in the patent to Arthur V. Gullborg, No. 1,307,734, of June 24. 1919.

The lubricating system disclosed in the Gullborg patent comprises a nipple adapted to be secured to a bearing to be lubricated and a compressor for supplying lubricant to said nipple, said compressor comprising a flexible discharge conduit one end of which is secured to the compressor and the other end of which is provided with a coupling member for making a quick detachable connection with the nipple. In this construction one end of the flexible discharge conduit is rigidly secured to the compressor and the opposite end thereof is rigidly secured to the coupling member, as a result of which the flexible discharge conduit is, in use, often placed under twisting stresses which in time destroy the flexible conduit or at least make it incapable of retaining lubricant under high pressure.

The objects of my invention are:

1st. To provide a compressor and a flexible discharge conduit provided at each end with a swivel coupling, one of said couplings being provided with means for making a detachable connection with the barrel of the compressor, and the other of said swivel couplings comprising means for making a detachable connection with a lubricant receiving nipple.

2nd. To provide a novel suitable coupling which can be used at both ends of said flexible discharge conduit.

3rd. To provide a swivel coupling for detachably connecting the flexible discharge conduit with the compressor, comprising means for protecting the user's hands from lubricant when attaching and detaching the flexible conduit to or from the compressor barrel; and 4th. To provide a swivel coupling of the character described, which is simple in construction, economical to manufacture, reliable and easy to operate.

Other objects will appear as this description progresses, reference being had to the accompanying drawings, in which Figure 1 is a view, partially in section and partially in elevation, showing my improved lubricant compressor in use for supplying lubricant to a bearing, the bearing being shown in cross section, and portions of the compressor being broken away.

Figure 2 is a view, partially in elevation and partially in section, of the discharge conduit of my improved compressor, the coupling members at either end being shown in central longitudinal section.

In both views, similar reference characters refer to similar parts.

The barrel of my improved compressor comprises two parts 5 and 6 having a threaded detachable connection whereby the cap can be removed for filling the barrel. A screw-threaded piston rod 7 has threaded engagement with an opening in the end of the cap 6 and its inner end is provided with a piston 8, shown in dotted outline in Figure 1. The end 9 of the compressor barrel is provided with an internally threaded nipple 10 (see Fig. 2), which forms the discharge outlet of the compressor barrel. The details of construction of the compressor thus far described form no part of my present invention, being illustrated and described in my co-pending application, S. No. 346,098, filed December 19, 1919.

The flexible discharge conduit 11, which is preferably formed of flexible metallic conduit of well known construction capable of withstanding comparatively large pressures, is provided at one end with a coupling member adapted to be detachably connected with the nipple 10, and at the other end with a coupling member which is adapted to be detachably connected with the nipple 12 secured to the bearing 13.

I shall first describe the construction of the nipple for securing one end of the flexible conduit to the compressor. This coupling comprises a screw-threaded nipple 14 which has threaded engagement with the nipple 10, inner end of the bore of this nipple being counter-bored, as shown at 15, in Figure 2. To facilitate the attachment to and detachment from the compressor of the nipple 14, a circular flange 16 is secured to the outer end thereof and in spaced relation thereto by means of the web 17; preferably the periphery of the flange 16 is knurled. The flange 16 performs another function in addition to that of facilitating the attachment of the flexible conduit. To fill the compressor, it is customary to detach the discharge conduit therefrom to permit the escape of air from the compressor barrel, as the lubricant is forced in at the open end thereof. It sometimes happens that a slight amount of lubricant is forced through the discharge nipple 10 and accumulates at the outer end thereof and there is usually a small amount of lubricant which adheres to the end of the nipple 14 when it is disconnected from the compressor. The flange 16 by enclosing the nipple 14 and by surrounding the nipple 10 during the attachment of the flexible conduit, protects the user's hands from being soiled by this lubricant.

A cup-shaped member 18 receives one end of the flexible metallic conduit 11, the bottom thereof being provided with a screw-threaded opening registering with the bore of the nipple 14. The bottom of the cup-shaped member 18 is held against the outer end of the nipple 14 by means of a tubular swivel member 19, the inner end of which is enlarged, as shown at 20, and journaled in the enlarged portion of the counter-bore of the nipple 14. The other end of the swivel member 19 has screw-threaded engagement with the openings in the bottom of the cup-shaped member 18 extends somewhat beyond the inner side of the bottom of this member. A gasket or bushing 21, preferably formed of asbestos cord, is confined between the bottom 22 of the counter-bore 15 and the enlarged end 20 of the swivel member 19 to form a seal to prevent the escape of lubricant between the swivel member and the nipple 14. It will be noted that the inner end of the tubular swivel member 19 is subjected to the pressure of the lubricant. Consequently, the greater the pressure on the lubricant, the greater the pressure will be on the gasket and thus insure the tightness of the seal between the swivel member and the nipple 14.

The bore of the cup member 18 is slightly larger in diameter than the diameter of the flexible metallic conduit 11 and is secured thereto by placing the cup member 18 in a vertical position with its open end upward, inserting the end of the flexible metallic conduit, and then pouring molten solder in the groove formed between the ground edge 23 of the cup and the side of the flexible metallic conduit. The molten solder passes down between the sides of the cup and the flexible metallic conduit and if sufficient solder is supplied, it will rise upwardly between the inner walls of the flexible metallic conduit and the screw-threaded portion of the swivel member 19, thereby soldering the swivel member to the inner walls of the conduit, or at least forming a ring of solder which acts as a lock nut for the threaded portion of the swivel member.

The coupling member at the other end of the flexible metallic conduit 11 is similar to that described above, except that the screw-threaded nipple 14' is not provided with the flange 16. A sleeve 25 has its inner end screw-threaded on to the nipple 14' and its outer end provided with a pair of oppositely disposed bayonet slots 26 for making a detachable connection with the pin 27 of the nipple 12 in the manner illustrated and described in the patent to Arthur V. Gullborg above referred to. A perforated cup leather 28 is slidably mounted in the sleeve 25 and urged outwardly against the end of the nipple 12 by means of a helical spring 29, one end of which abuts against the outer end of the screw-threaded nipple 14', and the other end of which abuts against a metallic washer 30 resting in the concavity of the cup leather 28. A shoulder 31 limits the outward movement of the cup leather 28. The construction of the nipple 12 is similar to that illustrated in the Gullborg patent, above referred to, and a detailed description thereof is, therefore, omitted.

While I have described the details of the preferred embodiment of my invention, it is to be clearly understood that my invention is not limited to these details, but is capable of other adaptations and modifications within the scope of the appended claims.

Having thus described my invention, what I claim is:

1. The combination with a member having a screw-threaded discharge nipple projecting therefrom, of a flexible discharge conduit having a coupling member at one end thereof comprising a second nipple having screw-threaded connection with said first named nipple, the inner end of the bore of said second nipple being counter-bored to provide a seat for a gasket, a circular flange enclosing said second nipple in spaced relation and secured to the outer end of said nipple, a cup-shaped member for receiving the end of said flexible conduit, said cup-shaped member having a screw-threaded opening in the bottom thereof registering with the bore of said second nipple, and means for swiveling said cup-shaped member upon said nipple, comprising a tubular swivel member the inner end of which is enlarged and journaled in the counter-bore of said second nipple, the inner end of said swivel member being subjected to the pressure of the lubricant, the outer end of said swivel member being threaded into the screw-threaded opening of said cup-shaped member to hold the bottom of said cup-shaped member against the outer end of said second nipple, a gasket confined between the enlarged end of said swivel member and the bottom of said bore, and solder for securing the end of said flexible conduit in said cup and forming a locking nut for the screw-threaded end of said swivel member.

2. The combination with a member having a screw-threaded discharge nipple projecting therefrom, of a flexible discharge conduit having a coupling member at one end thereof comprising a second nipple having screw-threaded connection with said first named nipple, the inner end of the bore of said second nipple being counter-bored to provide a seat for a gasket, a cup-shaped member for receiving the end of said flexible conduit, said cup-shaped member having a screw-threaded opening in the bottom thereof registering with the bore of said second nipple, and means for swiveling said cup-shaped member upon said nipple, comprising a tubular swivel member the inner end of which is enlarged and journaled in the counter-bore of said second nipple, the inner end of said swivel member being subjected to the pressure of the lubricant, the outer end of said swivel member being threaded into the screw-threaded opening of said cup-shaped member to hold the bottom of said cup-shaped member against the outer end of said second nipple, and a gasket confined between the enlarged end of said swivel member and the bottom of said bore.

3. The combination with a member having a discharge opening, of a flexible discharge conduit having a coupling at one end thereof comprising a cup-shaped member for receiving the end of said flexible conduit, a nipple having its inner end screw-threaded into said discharge opening, and its outer end contacting with the bottom of said cup member, the bottom of said cup member being provided with an opening registering with the bore of said nipple, a tubular swivel member extending through said nipple and the bottom of said cup, one end of said swivel member being subjected to the pressure of the lubricant, and a gasket confined between a portion of said swivel member and said nipple for sealing the swivel connection.

4. The combination with a member having a discharge opening, of a flexible discharge conduit having a coupling at one end thereof comprising a cup-shaped member for receiving the end of said flexible conduit, a nipple having its inner end connected with said discharge opening, and its outer end contacting with the bottom of said cup member, the bottom of said cup member being provided with an opening registering with the bore of said nipple, and a tubular swivel member extending through said nipple and the bottom of said cup.

5. The combination with a lubricant member having a discharge opening, of a flexible discharge conduit having a coupling at one end thereof, comprising a nipple threaded into said opening, a flange secured to the outer end of said nipple in spaced relation thereto, a member secured to the end of said conduit, and a tubular swivel member connecting said nipple and said last named member.

6. The combination with a member having a discharge opening, of a conduit and means for securing one end of said conduit to said member comprising a nipple adapted to be screwed into said opening, and a circular flange enclosing said nipple and secured thereto in spaced relation.

7. A coupling comprising a screw-threaded nipple, one end of the bore of which is counter-bored to provide a gasket seat, a cup-shaped member having a screw-threaded opening registering with the bore of said nipple, a tubular swivel member extending through said nipple and the bottom of said cup-shaped member and having an enlarged end portion, and a gasket confined between the enlarged end of said swivel member and the bottom of said counter-bore, the other end of said screw member having threaded engagement with said screw-threaded opening.

8. A coupling comprising a screw-threaded nipple, one end of the bore of which is counter-bored to provide a gasket seat, a cup-shaped member having an opening registering with the bore of said nipple, a tubular swivel member extending through said nipple and the bottom of said cup-shaped member and having an enlarged end portion, and a gasket confined between the enlarged end of said swivel member and the bottom of said counter-bore.

9. A coupling comprising a screw-threaded nipple, a cup-shaped member having an opening registering with the bore of said nipple, a tubular swivel member extending through said nipple and the bottom of said cup-shaped member, and a gasket confined between a portion of said swivel member and said nipple.

10. The combination with a coupling comprising two abutting members having registering bores, and a tubular swivel member extending through said bores, one of said abutting members being swiveled on said tubular swivel member, of a conduit having one end connected with one of said abutting members and to one end of said tubular swivel member.

In witness whereof, I hereunto subscribe my name this 26th day of May, 1920.

DOUGLAS F. FESLER.